(12) United States Patent
Tunstall-Pedoe et al.

(10) Patent No.: US 9,436,681 B1
(45) Date of Patent: Sep. 6, 2016

(54) NATURAL LANGUAGE TRANSLATION TECHNIQUES

(71) Applicant: Amazon Technologies, Inc., Reno, NV (US)

(72) Inventors: William Tunstall-Pedoe, Cambridge (GB); Robert Peter Stacey, Halstead (GB); Thomas Ashton, Cambridge (GB); Adam John Phillip Wood, Cambridge (GB)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 13/943,637

(22) Filed: Jul. 16, 2013

(51) Int. Cl.
*G06F 17/28* (2006.01)
(52) U.S. Cl.
CPC .................... *G06F 17/289* (2013.01)
(58) Field of Classification Search
None
See application file for complete search history.

(56) References Cited

U.S. PATENT DOCUMENTS

| | | | | |
|---|---|---|---|---|
| 5,268,839 A * | 12/1993 | Kaji | ................... | 704/3 |
| 5,640,575 A * | 6/1997 | Maruyama et al. | ............... | 704/4 |
| 5,895,446 A * | 4/1999 | Takeda et al. | .................... | 704/2 |
| 6,076,088 A * | 6/2000 | Paik et al. | | |
| 7,013,308 B1 | 3/2006 | Tunstall-Pedoe | | |
| 7,707,160 B2 | 4/2010 | Tunstall-Pedoe | | |
| 8,219,599 B2 | 7/2012 | Tunstall-Pedoe | | |
| 8,468,122 B2 | 6/2013 | Tunstall-Pedoe | | |
| 8,666,928 B2 | 3/2014 | Tunstall-Pedoe | | |
| 8,719,318 B2 | 5/2014 | Tunstall-Pedoe | | |
| 8,838,659 B2 | 9/2014 | Tunstall-Pedoe | | |
| 9,098,492 B2 | 8/2015 | Tunstall-Pedoe | | |
| 9,110,882 B2 | 8/2015 | Overell et al. | | |
| 2002/0010574 A1* | 1/2002 | Tsourikov et al. | ............... | 704/9 |
| 2002/0133347 A1* | 9/2002 | Schoneburg et al. | ......... | 704/257 |
| 2004/0167771 A1* | 8/2004 | Duan et al. | ..................... | 704/10 |
| 2006/0004721 A1* | 1/2006 | Bedworth et al. | ................ | 707/3 |
| 2007/0016400 A1* | 1/2007 | Soricutt | .................. | G06F 17/27 704/9 |
| 2007/0043708 A1 | 2/2007 | Tunstall-Pedoe | | |
| 2007/0055656 A1 | 3/2007 | Tunstall-Pedoe | | |
| 2008/0270428 A1* | 10/2008 | McNamara et al. | .......... | 707/100 |
| 2009/0070284 A1 | 3/2009 | Tunstall-Pedoe | | |
| 2009/0192968 A1 | 7/2009 | Tunstall-Pedoe | | |
| 2009/0262664 A1* | 10/2009 | Leighton | ................. | H04L 41/12 370/254 |
| 2010/0010989 A1* | 1/2010 | Li et al. | ........................... | 707/5 |
| 2010/0100369 A1* | 4/2010 | Shetty | ................... | G06F 9/4448 704/4 |
| 2010/0169352 A1* | 7/2010 | Flowers et al. | ............... | 707/759 |
| 2010/0205167 A1 | 8/2010 | Tunstall-Pedoe | | |
| 2010/0235164 A1* | 9/2010 | Todhunter et al. | ............... | 704/9 |
| 2010/0256973 A1* | 10/2010 | Chen et al. | ....................... | 704/4 |
| 2011/0044351 A1* | 2/2011 | Punati et al. | ................. | 370/408 |
| 2011/0202533 A1* | 8/2011 | Wang et al. | ................... | 707/738 |

(Continued)

FOREIGN PATENT DOCUMENTS

WO WO 2007/083079 7/2007

OTHER PUBLICATIONS

Aho et al., "Efficient String Matching: An Aid to Bibliographic Search", Jun. 1975, Communications of the ACM vol. 18 No. 6.*

(Continued)

*Primary Examiner* — Michael N Opsasnick
*Assistant Examiner* — Kee Young Lee
(74) *Attorney, Agent, or Firm* — Weaver Austin Villeneuve & Sampson LLP (57) ABSTRACT

Techniques are described for translating natural language input to a machine-readable form that accurately represents the semantic meaning of the input intended by the user.

20 Claims, 5 Drawing Sheets

(56) References Cited

U.S. PATENT DOCUMENTS

| | | | |
|---|---|---|---|
| 2011/0264439 A1* | 10/2011 | Sata et al. ........................ | 704/4 |
| 2011/0307435 A1 | 12/2011 | Overell et al. | |
| 2012/0036145 A1 | 2/2012 | Tunstall-Pedoe | |
| 2012/0041753 A1* | 2/2012 | Dymetman ......... | G06F 17/2775 704/4 |
| 2012/0047114 A1* | 2/2012 | Duan ................ | G06F 17/30448 707/694 |
| 2012/0096042 A1* | 4/2012 | Brockett ........... | G06F 17/30448 707/798 |
| 2013/0253913 A1 | 9/2013 | Tunstall-Pedoe | |
| 2013/0254182 A1 | 9/2013 | Tunstall-Pedoe | |
| 2013/0254221 A1 | 9/2013 | Tunstall-Pedoe | |
| 2013/0262125 A1 | 10/2013 | Tunstall-Pedoe | |
| 2013/0275121 A1 | 10/2013 | Tunstall-Pedoe | |
| 2014/0025689 A1* | 1/2014 | Kang ...................... | G06N 5/04 707/749 |
| 2014/0067870 A1* | 3/2014 | Chandrasekhar ............ | 707/797 |
| 2014/0351281 A1 | 11/2014 | Tunstall-Pedoe | |
| 2015/0356463 A1 | 12/2015 | Overell et al. | |

OTHER PUBLICATIONS

Macherey, "Statistical Methods in Natural Language Understanding and Spoken Dialogue Systems", Sep. 22, 2009.*
U.S. Appl. No. 13/711,478, filed Dec. 11, 2012, Lilly et al.
U.S. Appl. No. 13/896,078, filed May 16, 2013, Tunstall-Pedoe.
U.S. Appl. No. 13/896,144, filed May 16, 2013, Tunstall-Pedoe.
U.S. Appl. No. 13/896,611, filed May 17, 2013, Tunstall-Pedoe.
U.S. Appl. No. 13/896,857, filed May 17, 2013, Tunstall-Pedoe.
U.S. Appl. No. 13/896,878, filed May 17, 2013, Tunstall-Pedoe.
U.S. Appl. No. 13/899,171, filed May 21, 2013, Tunstall-Pedoe et al.
U.S. Appl. No. 13/925,246, filed Jun. 24, 2013, Holmes.
U.S. Appl. No. 13/925,627, filed Jun. 24, 2013, Tunstall-Pedoe et al.
Mishra, Taniya et al., "Finite-state models for Speech-based Search on Mobile Devices," Natural Language Engineering 1 (1), (1998), Cambridge University, United Kingdom.
Sagae, K. et al., "Hallucinated N-Best Lists for Discriminative Language Modeling." 2012 IEEE International Conference on Acoustics, Speech and Signal Processing (ICASSP), Mar. 25-30, 2012: pp. 5001-5004 (paper based on work done as part of a 2011 CLSP summer workshop at Johns Hopkins University).
Katz, S., "Estimation of probabilities from sparse data for the language model component of a speech recognizer" Acoustics, Speech and Signal Processing, IEEE Transactions on 35, No. 3 (1987): pp. 400-401.
Gale et al., "Good-Turing Frequency Estimation Without Tears", Journal of Quantitative Linguistics, vol. 2, No. 3 (1995): pp. 217-237.
U.S. Appl. No. 14/456,324, filed Aug. 11, 2014, Tunstall-Pedoe.
U.S. Appl. No. 14/828,176, filed Aug. 17, 2015, Overall et al.

* cited by examiner

NATURAL LANGUAGE TRANSLATION TECHNIQUES

BACKGROUND

The manner in which humans interact with computing devices is rapidly evolving and has reached the point where human users can access services and resources on the Internet using natural language. Speech recognition software tools continue to improve in terms of the fidelity with which human speech is captured despite the tremendous variation with which the input is delivered. However, there is still considerable work to be done with regard to making such input understandable to machines. That is, in order for a user's verbal request to be fulfilled, not only must the input be accurately and reliably captured, but the semantic meaning the input represents must be accurately and reliably translated to a form with which a machine can work. The extent to which the accuracy and reliability with which the input is entered or captured is compromised, this goal is undermined. For example, if the user is entering the input in a text interface, misspellings (either by the user or an auto-correction feature of the interface) and grammatical errors can result in the received text being radically different than the intended semantic meaning. In the context of speech recognition, misrecognition of words and phrases can lead to similar results.

DETAILED DESCRIPTION

This disclosure describes techniques for translating natural language input, either in the form of captured speech or entered text, to a form which is understandable to a computing device and that accurately represents the semantic meaning of the input intended by the user. In addition to matching the words and phrases of the received input to stored words and phrases, the system described herein also takes into account various probabilities associated with the received input that model what the user is likely to have actually said or intended given the received input. These probabilities are used to assign scores to different translation options from which the system can then select the best (or none if appropriate). An example may be illustrative.

Suppose the user asks the system "What is the airspeed velocity of an unladen swallow?" and the speech recognition software captures this input as "what is the nearest tree velocity oven laden swallow." Conventional approaches to translation of this input might just take this text and attempt a response based on the mistranslation or specific keywords recognized in the translation, potentially resulting in a poor user experience. By contrast, using the techniques described herein, the system can better understand what the user is likely to have said based on the received input, translate the intended semantic meaning accurately, and generate an appropriate response, e.g., "Which do you mean, African or European swallow?"

Figure 1:
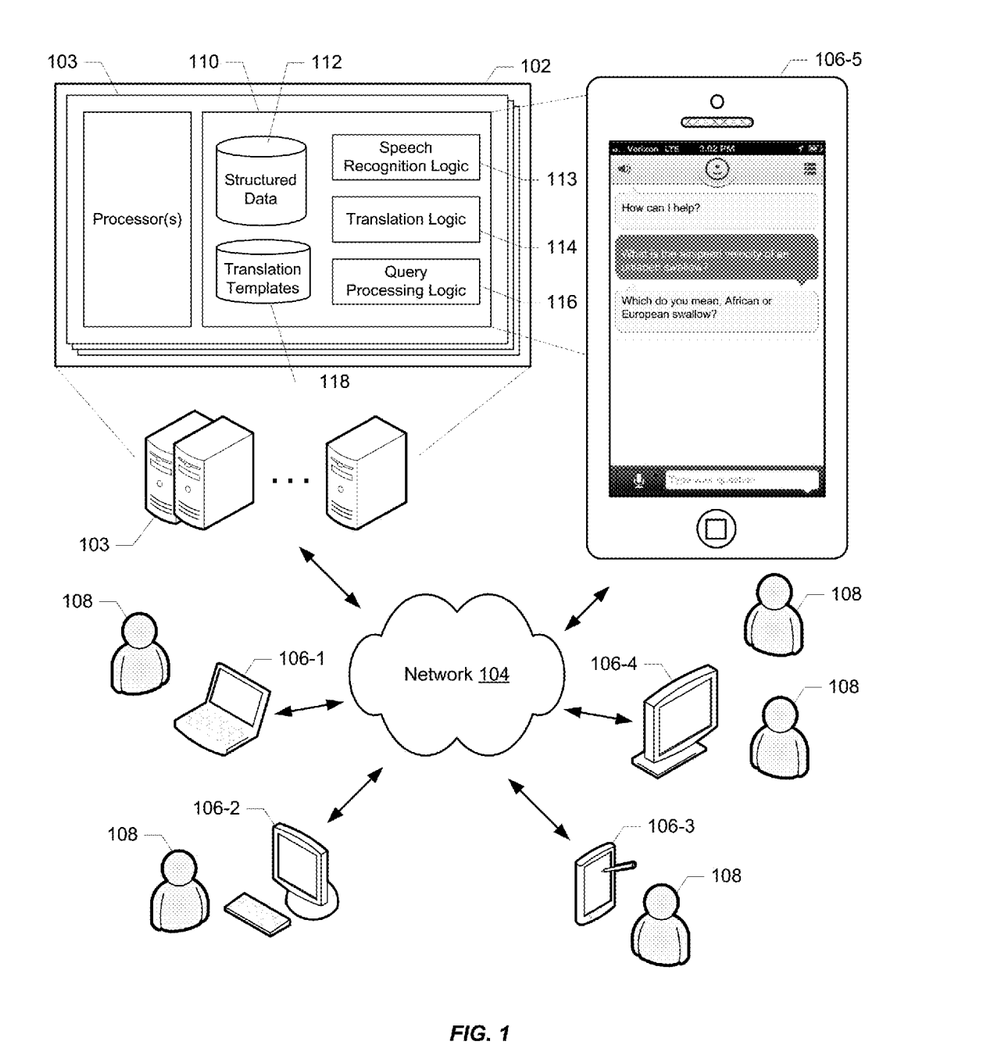
FIG. 1 illustrates an example of a computing environment in which natural language translation techniques may be employed.

FIG. 1 illustrates an example of a computing environment in which natural language translation techniques as described herein may be practiced in the context of an online service 102 (e.g., a knowledge representation system, a search engine, an online encyclopedia, an online retailer, a messaging system, etc.) via network 104 interacting with a variety of client devices (106-1 through 106-5) associated with users 108. Service 102 may conform to any of a wide variety of architectures including, for example, a services platform deployed at one or more co-locations, each implemented with one or more servers 103. Network 104 represents any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc. Client devices 106 may be any suitable devices capable of connecting to network 104 and consuming services provided by service 102. Such devices may include, for example, mobile devices (e.g., cell phones, smart phones, and tablets), personal computers (e.g., laptops and desktops), set top boxes (e.g., for cable and satellite systems), smart televisions, gaming consoles, etc. More generally, at least some of the examples described herein contemplate various distributed computing implementations. The term "distributed computing" refers to computing models capable of enabling ubiquitous, convenient, on-demand network access to a shared pool of computing resources (e.g., networks, servers, storage, applications, and services).

It should also be noted that, despite references to particular computing paradigms and software tools, the computer program instructions on which various implementations are based may correspond to any of a wide variety of programming languages, software tools and data formats, and may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular protocols herein are merely by way of example. Suitable alternatives known to those of skill in the art may be employed.

According to a particular class of implementations, service 102 is a knowledge representation system for filling information needs (e.g., question answering, keyword searching, etc.) using a knowledge base 110 that stores information as structured data 112. Knowledge base 110 includes speech recognition logic 113 that captures human speech as natural language input, and translation logic 114 which translates between the natural language input and a machine-readable format that is compatible with structured data 112. That is, translation logic 114 translates natural language input (e.g., captured speech or entered text received from device 106-5) to machine-readable queries that are then processed with reference to structured data 112. Translation logic 114 also translates responsive data from structured data 112 and/or its own machine-readable queries requiring further input to natural language for presentation to the user (e.g., on device 106-5). Query processing logic 116 processes machine-readable queries generated by translation logic 114 with reference to structured data 112 to generate responses which may then be translated to natural language by translation logic 114. Knowledge base 110 also includes translation templates 118 that are selected by translation logic 114 to efficiently translate the received natural language input according to the techniques described herein.

It should be noted that implementations are contemplated in which at least some of the functionality depicted as being included in knowledge base 110 of FIG. 1 may reside on either or both of client device 106-5 and servers 103 (as indicated by the dashed lines in FIG. 1). For example, speech recognition logic 113 might reside on client device 106-5 and communicate over the intervening network(s) with translation logic 114. In another example, an application on client device 106-5 might provide only sufficient interface functionality necessary to communicate with the back-end functionality of the knowledge base. The scope of the invention should therefore not be limited with reference to the specific implementations described herein.

According to a particular class of implementations, the system in which natural language translation as described herein is supported (e.g., service 102 of FIG. 1) is implemented as a knowledge representation system as described, for example, in U.S. Patent Publication No. 2007/0043708 entitled *Knowledge Storage and Retrieval System and Method*, and U.S. Patent Publication No. 2007/0055656 entitled *Knowledge Repository*, the entire disclosure of each of which is incorporated herein by reference for all purposes. According to such implementations, natural language input is translated to machine-readable queries for processing by a knowledge base using translation templates (e.g., templates 118 of FIG. 1) as described in these publications. However, it will be understood that the various functionalities described herein are much more widely applicable. That is, for example, natural language translation may be provided in support of any of a variety of services that fill information needs (e.g., search engines, online encyclopedias, etc.), as well as any type of service that facilitates any of a wide variety of transactions (e.g., online retailers, financial institutions, communication or messaging systems, etc.). Further, the specific translation mechanisms, e.g., templates, described herein are merely by way of example. The scope of the invention should therefore not be limited to the examples described herein.

Figure 2:
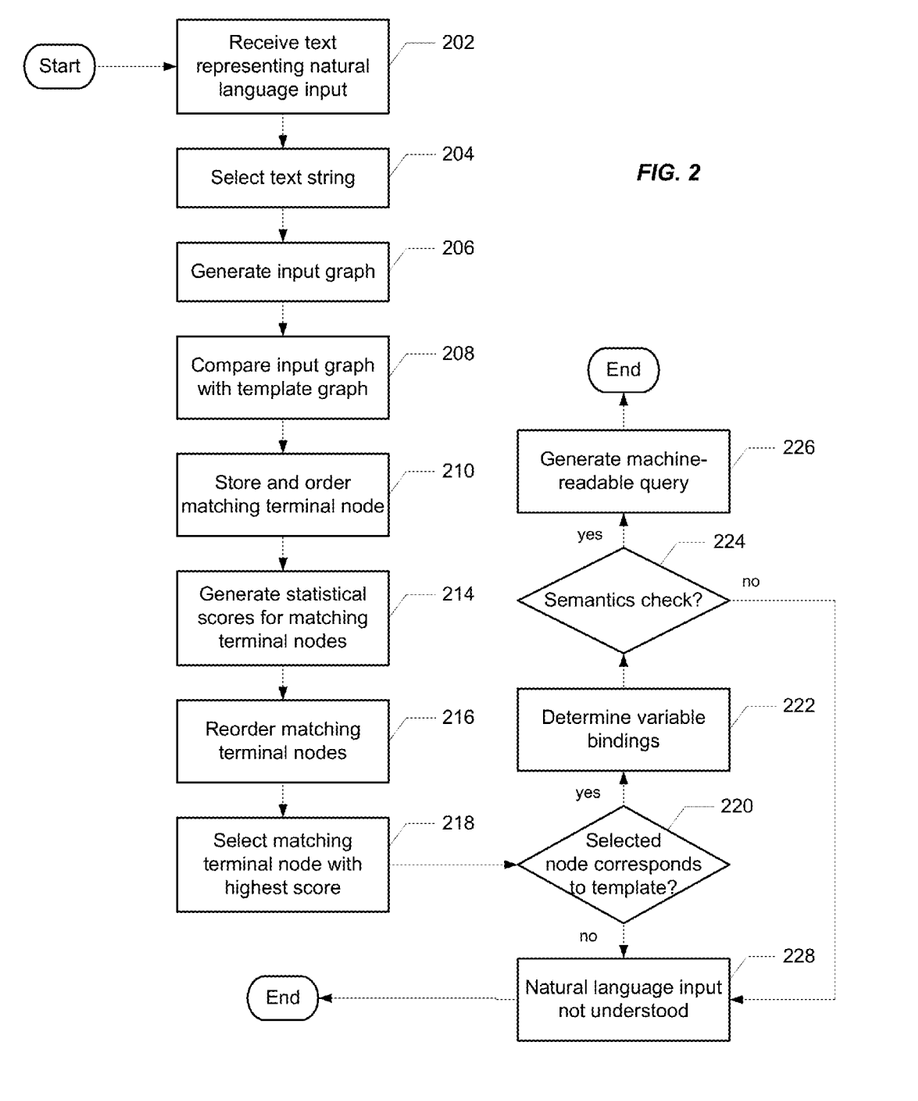
FIG. 2 illustrates an example of a process for translating natural language input.

An example of the operation of a specific implementation of natural language translation logic in the context of a knowledge representation system will now be described with reference to the flow diagram of FIG. 2 and the computing environment of FIG. 1. The translation logic receives text (either from speech recognition logic or a text entry interface) representing one or more interpretations of natural language input captured from a user (202). That is, speech recognition logic may return multiple interpretations or "hypotheses" for a given user utterance. If multiple interpretations about what the user said are received, each may or may not have an associated confidence value representing the reliability of the capture as estimated by the source of the interpretations. Each interpretation or hypothesis has a corresponding text string representing the captured speech. The text strings are processed as follows.

Figure 3:
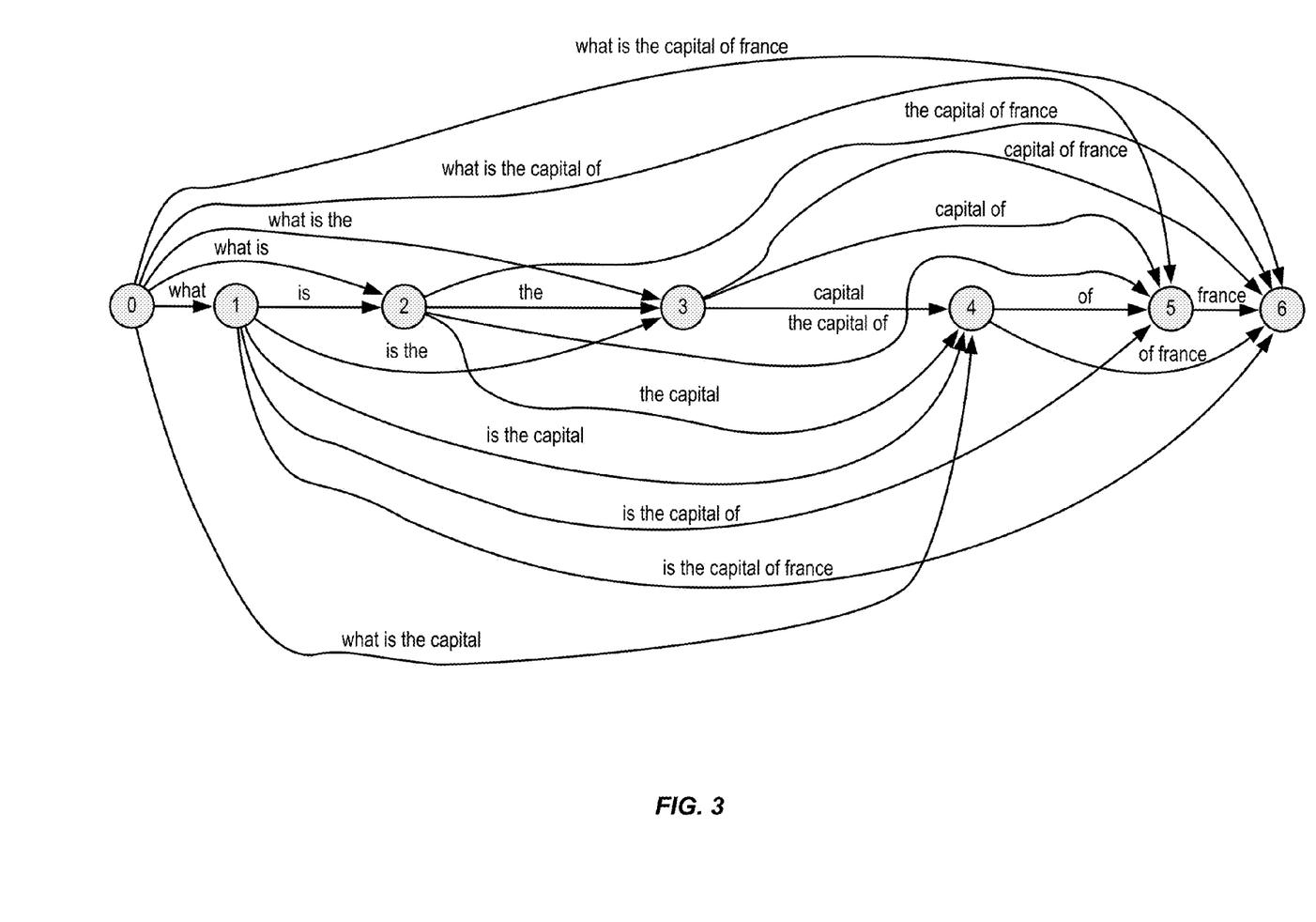
FIG. 3 illustrates an example of a graphic representation of natural language input.

The text string is selected (204) and an input graph is generated (206) representing the different ways to break up the string for pattern matching. For example, the string "what is the capital of france" can be broken up into ["what is", "the capital of", "france"] or ["what is the", "capital of france"], etc. There are 2^(n-1) distinct breakups or breakup elements for a string having n words. This may be represented in a graph with n(n+1)/2 edges. An example of such a graph for the string "what is the capital of france" is shown in FIG. 3. If multiple interpretations of the captured input are received they may all be represented with a single input graph. For example, identical words and phrases in the different interpretations might be represented by the same graph edge, while alternative words and phrases from different interpretations might be represented by alternative, parallel edges. Those of skill in the art will appreciate the various ways in which such different interpretations might be combined in a single graph. Alternatively, multiple input graphs, e.g., one for each interpretation, may be generated. Pattern matching is then performed by comparing the input graph with a template graph that represents the system's translation templates to determine whether an appropriate translation template exists (208).

Figure 4A:
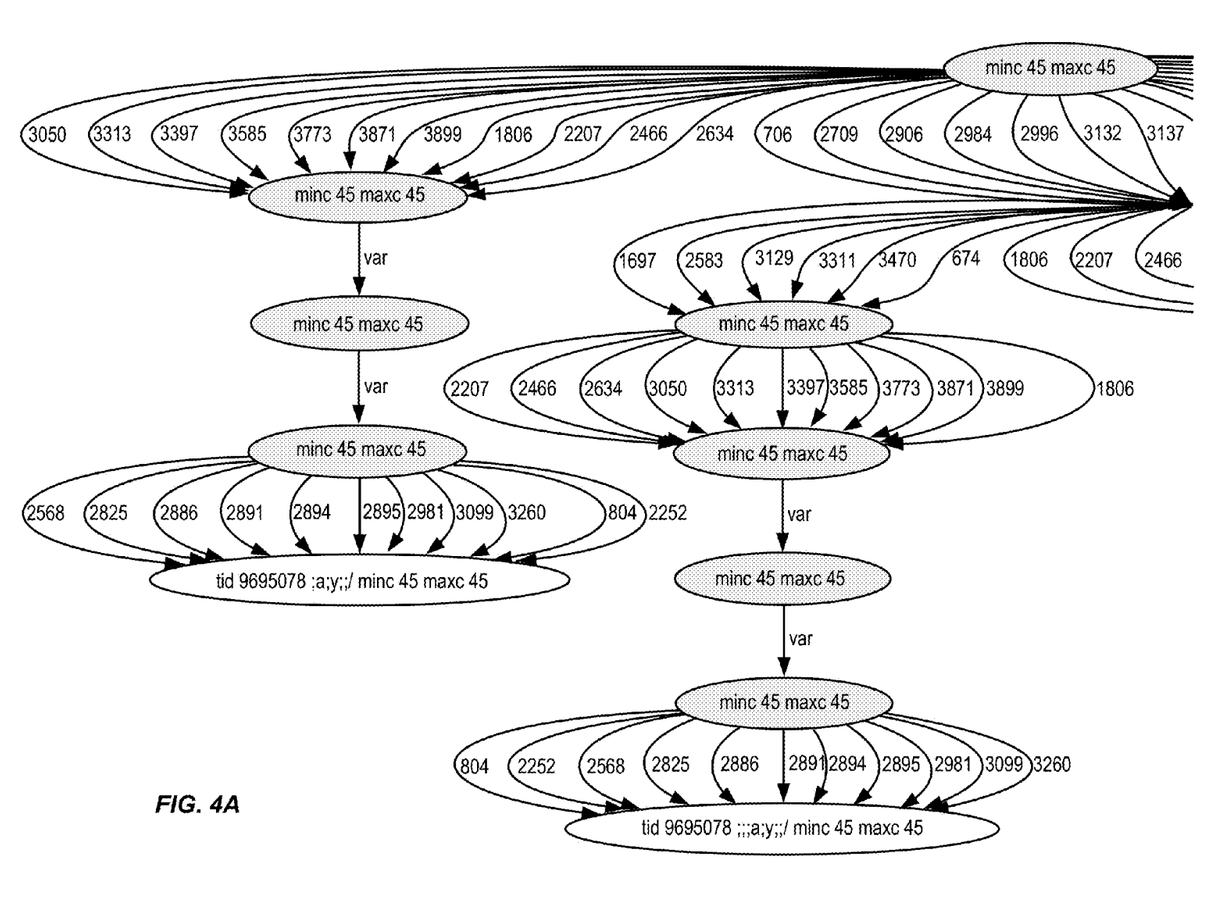
FIGS. 4A and 4B illustrate an example of a graphic representation of a portion of a translation template graph.
Figure 4B:
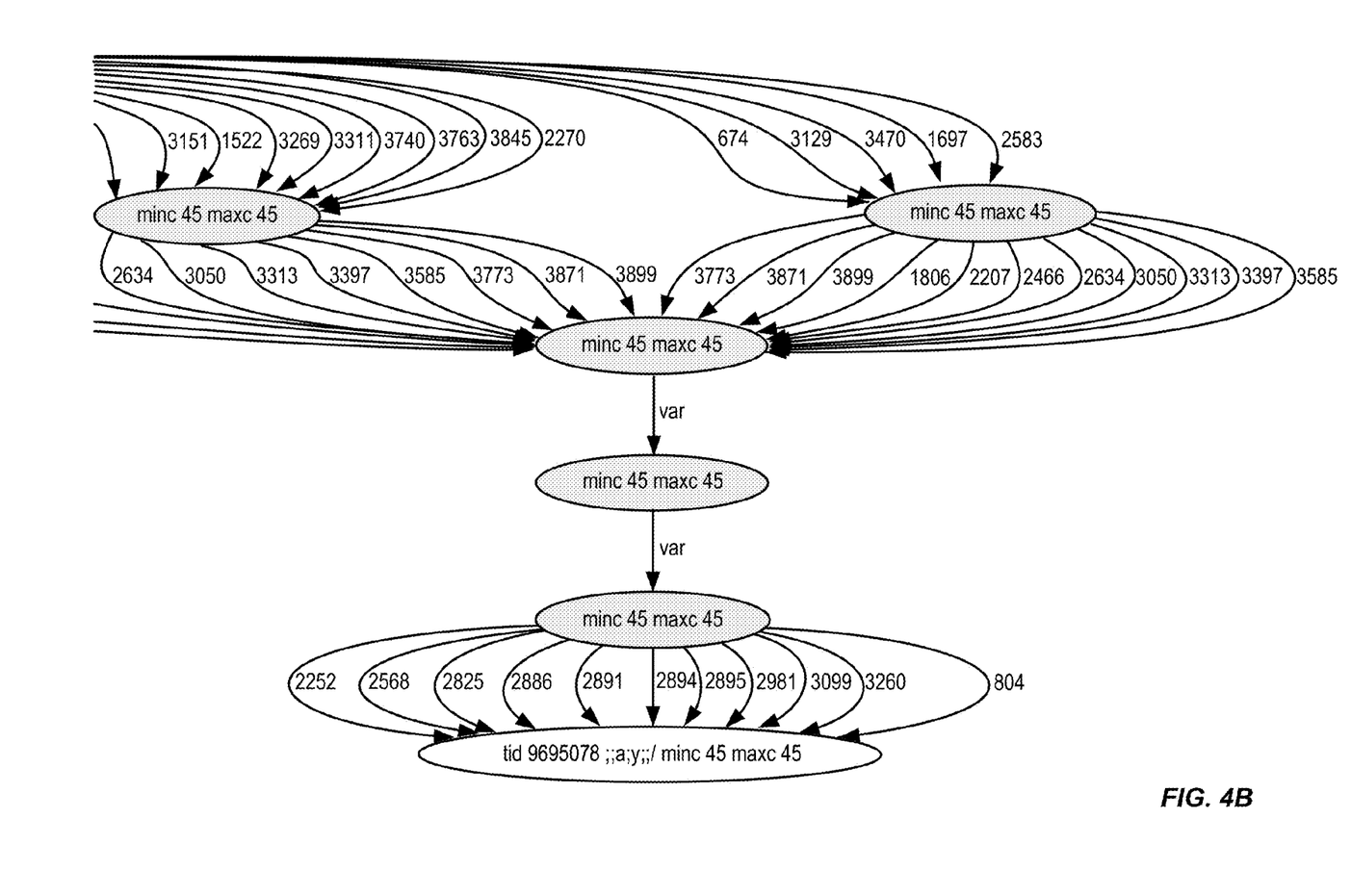

According to a particular implementation, each translation template includes a pattern of fixed string expressions. The template graph, e.g., a finite space automaton, represents the patterns of the translation templates, i.e., the regular expression portions of the templates. The edges of the template graph represent strings or variables from the templates that can be bound to strings of the input. As will be discussed, the edges of the template graph may be weighted to reflect a variety of probabilities, e.g., the likelihood of reaching a particular understanding via that edge. Terminal nodes of the template graph correspond to templates to be used for translation if reached. Different terminal nodes have different priorities based on the priority of the corresponding template. According to various implementations, a template's priority is represented by a value or score that specifies a priority ordering that may be determined by a number of template characteristics, e.g., how likely the corresponding understanding is; template specificity (e.g., more specific templates might tend to have a higher priority); templates that handle exceptions for templates further down the priority ordering might have a higher priority; etc. The priority score might represent a combination of more than one of these template characteristics. All nodes in the template graph are labeled with the highest priority template that can be reached from that point in the graph. An example of a portion of such a graph representing a single template pattern is shown in FIGS. 4A and 4B. It should be noted that the complete template graph represents all of the patterns for all of the templates.

Edges of the template graph are labeled with integers or the label "var." Integers represent transitions to follow if a particular fixed string is read. The label "var" represents transitions to follow if binding a substring of the input to a variable. In the example depicted in FIGS. 4A and 4B, the nodes are each labeled with both the minimum and maximum priority template reachable from that node. This may help guide a search to favor higher priority templates. Terminal nodes are labeled with one or more matching translation template IDs and the variable names to which to bind elements occurring in the match. The template graph may also include at least one terminal node that does not correspond to a translation template (not shown), representing the possibility that an appropriate translation template does not exist, e.g., that the natural language input was not understood. Alternatively, this possibility may not be explicitly represented in the graph, i.e., it could be inferred from the failure to reach a terminal node.

Matching the input graph to the template graph proceeds using automata selection. Nodes in the resulting intersection graph are tuples (v,u) of the nodes of the input graph (u) and the template graph (v). An edge exists between the nodes in the intersection graph (u1,v1) and (u2,v2) if, and only if, there is an edge in the input graph between (u1) and (u2), there is an edge in the template graph between (v1) and (v2), and the labels on these edges are compatible. Compatibility may mean an exact match, but can include insertion or removal of a word to achieve a match (in which case a penalty may be added). The label "var" on a template graph edge is compatible with any label on an input graph edge, and integer labels on a template graph edge are compatible with labels in the input graph if, and only if, the set of strings corresponding to the integer contains the string on the input graph edge. A node in the intersection graph is a terminal node if, and only if, it is a terminal node in both the template graph and the input graph. The template priorities associated with the nodes of the template graph cause the traversal of the intersection graph to proceed preferentially following edges from nodes that have the highest priority terminal nodes as children. As indicated above, the matching node for a given text string might represent the fact that an appropriate translation template does not exist. In some cases, a "var" edge of a template graph may be "skipped" by, for example, binding the corresponding variable to a placeholder value (e.g., a common or expected value given the context of the variable) or a null value, and/or by modifying the processing of the resulting query to accept a placeholder/null value for that variable.

Referring again to FIG. 2, the terminal node(s) reached for the input string(s) is (are) stored and, where there are multiple, the corresponding hypotheses are ordered with respect to each other according to the priorities of the corresponding matching templates (210). A hypothesis may have one, more than one, or no matching terminal node. If there are multiple matching nodes for a given hypothesis, the matching nodes are ordered for that hypothesis by their priorities. A statistical score is generated for each of the terminal nodes (or its corresponding template) (214) and the hypotheses are reordered according to the statistical scores (216).

The hypothesis with the highest statistical score is selected (218), and if the highest priority matching node corresponds to a translation template (220), the variable bindings for the matching template are determined (222), the semantic checks associated with the template are performed to verify that the variable bindings make sense for that template (224) and, if so, a machine-readable query is generated for processing by the knowledge base (226). If, on the other hand, the selected node represents the decision not to understand the input (220), the lack of understanding is communicated to the user (228) or, alternatively, the input may be ignored.

Some template patterns may include several consecutive variables and few fixed strings of text. This may result in matching of such templates to a large number of input strings. Performing the semantic checks for each variable for every match may represent a performance bottleneck. Therefore, according to a particular implementation, we take advantage of the fact that the failure of a particular variable binding for a given input text breakup element obviates the need to perform related semantic checks for that matching node, e.g., if a particular variable binding will always fail for a given breakup element, semantic checks for other combinations of variables and breakup elements associated with the failed binding need not be run. Further, if there are multiple matching nodes for which the variable binding for a particular breakup element would otherwise need to be checked, the failure of the binding for one of the nodes may be used to reduce the number of semantic checks for any other node for which that variable and breakup element combination arises.

According to a particular implementation, one or more semantic checks for each template are extracted and tested to determine whether a particular binding of a variable will cause the entire set of semantic checks to fail. These "partial" semantic checks have the property that they refer to just a single variable from a pattern, and that if they fail for a particular binding then the overall set of semantic checks will also fail. When we get a match against a template pattern, we take the graph generated by matching nodes against each other from the input and template graphs, and work backwards from the matching terminal node enumerating possible paths to the start. Each of these paths represents a particular way to bind sections of the input string to the variables. When we encounter an edge that represents a variable for which we managed to successfully extract a semantic check with which to test it, we perform the test. If the test passes we continue working backwards to the root. If it fails then we backtrack and do not generate any paths using that edge. We also store the result of testing that semantic check with that binding in a hash map so that if any other paths make the same test we can rule those out quickly too.

Statistical Scoring Scheme

According to a particular implementation, the statistical scoring scheme employs a Bayesian approach that attempts to identify the most likely input intended by the user given the text received. Assume the user intended input text T (which translates with template U), but the system actually received input text T'. The scoring scheme attempts to maximize the expression P(T, U|T'), i.e., the probability of T and U given the text received, i.e., T'. This expression may be approximated as follows:

$$P(T,U|T')=P(T'|T,U)P(T,U)/P(T') \quad (1)$$

$$\alpha P(T'|T,U)P(T,U) \quad (2)$$

$$=P(T'|T)P(T,U) \quad (3)$$

$$=P(T'|T)P(T|U)P(U) \quad (4)$$

where P(T'|T) represents the probability that, if the user intended the text T, T' is actually received; P(T|U) represents the probability of the user intending a particular input text T given that the intended text would translate with a particular template U; and P(U) represents the prior probability that the user intended an input which would/should be translated with template U.

Equation (1) represents the application of Bayes' theorem to the expression we wish to maximize. Expression (2) follows because T' is a constant for all values of T and U. Expression (3) assumes that the probability of substituting T for T' is approximately independent of U. Finally, expression (4) applies the chain rule to separate P(T, U) into two components. Note that we are treating the value of U as being determined by T, i.e., we take each hypothesis of what the user intended to say T and run that through the standard translation system to get the template match U that corresponds to that text. As mentioned above, we account for the possibility that a question doesn't translate at all by treating not translating as another logical template with its own prior probability. The problem therefore becomes one of finding, for a given input text T', the value of T (and therefore also U) that maximizes expression (4).

Log Probabilities

To train the statistical models we used a log of inputs actually received by the system to represent the statistics for the inputs intended by users. We also used the standard approach of taking the logarithm of all probability values before manipulating them. For example, the probability 0.0005 becomes a log probability of −7.601. To multiply together probabilities we can add their corresponding log-probabilities, since:

$$\log(ab)=\log(a)+\log(b) \qquad (5)$$

So, for example if probability a is 0.0005 (with a log probability value of −7.601) and probability b is 0.0001 (with a log probability of −9.210) to calculate the log probability of the product of a and b we can just add the two individual log probabilities to get −16.811.

To divide probabilities we subtract one from the other, since:

$$\log(a/b)=\log(ab^{-1})=\log(a)+\log(b^{-1})=\log(a)-\log(b) \qquad (6)$$

To add and subtract probabilities in the log domain requires using the exp( ) function, but for these models we don't have to add or subtract probabilities at run-time. Smaller probabilities correspond to more negative log-probabilities. The largest possible probability of 1.0 corresponds to a log probability of 0.0, and the smallest possible probability of 0.0 corresponds to a log probability of negative infinity.

Sparse Data and Good-Turing Estimation

A common problem with many types of linguistic data (for example, words occurring in documents or log entries) is that however much training data is read there will always be events that are not seen in the training data. The naive approach to calculating the probability of a word that appears r times in the training data would be to divide r by the total number of words in the training text N (this is referred to as the "maximum likelihood" estimate). This estimate would not be appropriate for this type of data since it would estimate the probability of any word not seen before as zero. One technique for dealing with this problem is the Good-Turing estimator described in *Good-Turing Frequency Estimation Without the Tears*, William Gale and Geoffrey Sampson, pp. 217-37 of the Journal of Quantitative Linguistics, vol. 2, 1995, the entirety of which is incorporated herein by reference for all purposes.

The Good-Turing estimate of the probability $p_0$ of seeing a word that we haven't seen before is:

$$p_0=n_1/N \qquad (7)$$

where $n_1$ is the number of words seen just once in the training data, and N is the total number of words in the training data. An intuition for this is that when we saw each of these words they were previously an unseen word, so a good estimate for the probability of seeing a new unseen word is the number of times we saw a word in the training data that was previously unseen. Note that this doesn't tell us the probability of seeing a particular word that we haven't seen before, just the total probability mass that should be set aside for words that weren't in the training data.

Extending the intuition, a good estimate for the fraction of words in a new data stream that we expect to see r times is the fraction of words that were seen r+1 times in the training data, since when we saw them the r+1st time they were words that we had seen just r times. For the probability $p_r$ of seeing any of the words that were seen r times in the training data we have:

$$p_r=(r+1)n_{r+1}/N \qquad (8)$$

Again this gives just the total probability mass that should be assigned to all words that occurred r times, not the probability of a particular word that occurred r times. However, in the case r>0 we know how many of these words there actually are, so we can assign a probability to a particular word:

$$P(w)=(r+1)n_{r+1}/(Nn_r) \qquad (9)$$

where w is a word that occurred r times in the training data.

In practice a problem with this estimator is that there will be gaps in the counts that occur in the training data; particularly for high values of r. For example, while there will usually be plenty of words that occurred 1 to 3 times, there might only be one word that occurred 23,452 times, and no words that occurred 23,453 times, and then one word that occurred 23,454 times. The Gale and Sampson paper suggests a solution to this which they term the "Simple Good Turing" approach. We first average out the counts across the zeros. To quote them directly:

"[D]efine a new variable $Z_r$ as follows: for any sample frequency r, let r' be the nearest lower sample frequency and r" the nearest higher sample frequency such that $n_{r'}$ and $n_{r''}$ are both positive rather than zero. Then $Z_r=2n_r/(r''-r')$. For low r, r' and r" will be immediately adjacent to r, so that r"−r' will be 2 and $Z_r$ will be the same as $n_r$; for high r, $Z_r$ will be a fraction, sometimes a small fraction, of $n_r$. Most of our estimates of expected frequencies will be based on $Z_r$ rather than directly on $n_r$."

Gale and Sampson then take the log of $n_r$ and the log of r, perform a linear regression to get a line of best fit and then define a criteria for switching from Good-Turing smoothing based on the $Z_r$ counts directly and the counts that would be estimated from the best fit line. However, we take a slightly simpler approach.

We expect the values $Z_r$ and r to follow approximately the following relationship:

$$Z_r=Ar^b \qquad (10)$$

where A and b are constants that are inferred from the data. We estimate these constants by using a standard function minimization library to choose the values that minimize the expression:

$$\text{Err}(A,b)=\Sigma_r|Ar^b-Z_r| \qquad (11)$$

And then we can estimate P(w) using the inferred relationship:

$$P(w)=(r+1)(A(r+1)^b)/(NAr^b)$$

$$=(r+1)^{b+1}/(Nr^b) \qquad (12)$$

This approach is more accurate for lower values of r than the method proposed by Gale and Sampson, so there is no need to have a criteria for switching between estimation methods.

We keep the estimate $n_1/N$ for the total probability of all unseen words, and we consider this reliable. However, when we add the probabilities for the other words from equation (12) we may find that the probabilities no longer sum to one. Therefore we scale the probabilities derived from (12) to make sure this condition is satisfied.

The Template Probability Model P(U)

We calculate template probabilities by running log questions through the system using only the best speech recognition output and not considering any substitutions, and counting how often each template is matched and how often we are not able to understand inputs. These counts follow a similar distribution to words: there are a few templates that get matched very frequently, a large number that are matched only once or twice even in a large number of log entries, and many that we never see matched at all. Therefore we apply Good-Turing smoothing to estimate the template probabilities, dividing the unseen mass $p_0$ equally between the templates that we know have not been matched. We do not apply Good-Turing smoothing to the probability of not translating the input, since this does not seem to follow the same distribution as the translated template probabilities.

In the scoring scheme we simply take the log of the Good-Turing probability estimate of the probability of U and use that directly:

$$S(U) = \log P_{GT}(U) \qquad (13)$$

The Text Probability Model P(T|U)

We calculate word probabilities by assuming independence between the words and simply counting the number of times we see different words matched with different templates (or words that are in inputs that are not understood.) That is:

$$P(w_1^n|U) = \Pi_{1 \leq i \leq n} P(w_i|U) \qquad (14)$$

where $w_1^n$ represents the sequence of words $W_1, W_2, \ldots W_n$. We estimate $P(w_i)$ using a "back-off" model: if the word $w_i$ was seen one or more times with the template U then we use the Good-Turing estimate of the probability of that word using the statistics collected from that template. If it was not seen before then we back off to using the statistics collected from all the inputs, after applying a normalization factor to make sure the probabilities sum to one:

$$P(w_i|U) = P_{GT}(w_i|U) \text{ if } c_U(w_i) > 0 \qquad (15)$$

$$\alpha_U P_{GT}(W_i) \text{ otherwise,}$$

where $P_{GT}$ is the Good-Turing probability estimate, $c_U(w)$ is the number of times word w was seen in the training data with template U, and $\alpha_U$ is a normalisation factor. $\alpha_U$ is determined by the total probability of all the unseen words in the model conditioned by the template match, and the total probability of all the words in the unconditioned model that cannot be used because they are masked by the probabilities in the more specific model:

$$\alpha U = (1 - \Sigma_{w: c_U(w) > 0} P_{GT}(w|U))/(1 - \Sigma_{w: c_U(w) > 0} P_{GT}(w)) \qquad (16)$$

Further information regarding this model (referred to as the Katz back-off model) may be found in *Estimation of Probabilities From Sparse Data for the Language Model Component of a Speech Recognizer*, Katz, S. M., IEEE Transactions on Acoustics, Speech, and Signal Processing, 35(3), 400-401 (1987), the entire disclosure of which is incorporated herein by reference for all purposes.

For the Good-Turing estimate that is not conditioned by the template match $P_{GT}(w)$ we divide the probability mass for the unseen words by an arbitrary number to get an estimate of the probability for a specific word that was not seen anywhere in the training data. Since there's no data from which we can set this value (and it's not clear that it is meaningful anyway) we choose an arbitrary value that results in estimates that are in some sense not too big and not too small.

One problem with the above approach is that by using equation (14) we assign exponentially decreasing probability values to longer utterances. This means that if we insert a word into an utterance we are likely to get a much lower probability score, and if we remove a word we are likely to get a much higher probability score. In practice we use log probabilities when calculating the value in (14):

$$\log P(w_1^n|U) = \Sigma_{1 \leq i \leq n} \log P(w_i|U) \qquad (17)$$

To avoid the bias towards shorter sentences, we calculate the average value k of log $P(w_i|U)$ in a held out test set, and subtract that value from the total log probability for each word to get a score $S(w_1^n|U)$ for the text that is in some sense independent of the number of words read:

$$S(w_1^n|U) = \Sigma_{1 \leq i \leq n} \log P(w_i|U)) - nk \qquad (18)$$

The Substitution Model P(T|T')

In the case of speech recognition alternatives we didn't get confidence scores from our speech recognition systems, so we take the approach of applying a fixed score penalty $h_{speech}$ for choosing an alternative that is not the best hypothesis:

$$S_{speech}(T|T') = h_{speech} \text{ if } T \neq T' \qquad (19)$$

0 otherwise.

If, on the other hand, confidence scores are associated with the alternative interpretations, these may be used to generate values for T and T'.

In the case of spelling correction, we count the number of character edits made, $n_{char}$, and the number of sounds-like edits made, $n_{soundslike}$, and apply a penalty $h_{char}$ and $h_{soundslike}$ for each.

$$S_{spelling}(T|T') = h_{soundslike} n_{soundslike} + h_{char} n_{char} \qquad (20)$$

It should be noted that implementations are contemplated in which a Hidden Markov Model is trained for edits based on training examples.

The Final Score and Thresholding

For the final score we compare the score for the hypothesized text and understanding to the score for not making any substitutions and not understanding the input. This makes sure that we don't reject a substitution simply because the words it contains are unlikely, but instead looks at whether we are making the data more likely than it was before by making the changes:

$$S(T, U|T') = S(T|T') + S(T|U) + S(U)$$

$$-S(T'|T) - S(T|U_{not-understood}) - S(U_{not-understood}) \qquad (21)$$

where $U_{not-understood}$ represents the hypothesis that the input should not be understood.

To decide whether to make a substitution or just leave the input as being not understood we threshold this score and only perform the change if the score exceeds the threshold. According to a particular implementation, the selection of the threshold is a manual process based on an evaluation of the quality of results with different scores from a test set.

Model Component Evaluation

We can evaluate the quality of the components P(T|U) and P(U) of the model using a score referred to as perplexity. For example, if we want to calculate the perplexity of a sequence of test words $w_1^n$ using a model P(w) the perplexity is defined as:

$$PP(w_1^n) = \exp(-(\Sigma_i \log P(w_i))/N) \qquad (22)$$

In general better models will have a lower perplexity scores for held out test sets.

According to some implementations, both the input graph and the template graph may be expanded to include edges that represent multiple speech alternatives (e.g., misspellings or homophones) for particular words or phrases to expand the range of possible inputs and matches. The selection of these alternatives for inclusion may be guided by some of the probabilities used in the statistical scoring. While traversing the graphs, terminal nodes reached via paths including such alternatives could be penalized in a way that is represented in the final statistical scoring. As will be understood, such an approach supports score computation that approximates expression (4) as the graphs are being traversed, i.e., removing U related terms from the equation by replacing P(T|U) with P(T), and replacing P(U) with the probability that any arbitrary template would be matched. This would be an approximation of the score calculated once a terminal node corresponding to a particular U is reached. At the end, the possible matching templates could be prioritized initially by these "accumulated" scores and then reordered using the final scoring.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer program product for translating natural language input to a machine-readable format for processing by a knowledge base, the computer program product comprising one or more non-transitory computer-readable media having computer program instructions stored therein, the computer program instructions being configured such that, when executed, the computer program instructions cause one or more computing devices to:
   receive a text string derived from natural language input;
   generate an input graph for the text string, the input graph representing a plurality of different subsets of words in the text string;
   retrieve a template graph representing a plurality of translation templates associated with the knowledge base, each translation template being for translating matching natural language input to the machine-readable format, and each translation template corresponding to at least one of a plurality of terminal nodes in the template graph, wherein each terminal node of the template graph has an associated template priority that is based on the corresponding translation template, and wherein each internal node of the template graph is labeled with an identifier of a highest priority template that can be reached from that point in the template graph;
   generate an intersection graph from the input graph and the template graph, each node in the intersection graph representing a tuple of corresponding nodes in the input and template graphs;
   process the intersection graph to identify one or more candidate terminal nodes of the intersection graph, the template priorities associated with the terminal nodes of the template graph causing processing of the intersection graph to proceed preferentially along edges of the intersection graph leading to terminal nodes of the intersection graph that represent terminal nodes of the template graph that correspond to the highest priority templates;
   generate a score for each terminal node of the template graph that corresponds to one of the candidate terminal nodes of the intersection graph, each score based at least in part on a probability that the text string corresponds to an intended meaning of the natural language input, and a translation template corresponding to the terminal node of the template graph;
   select a first terminal node of the template graph based on the one or more scores, a first translation template corresponding to the first terminal node of the template graph;
   translate the text string using the first translation template thereby generating a machine-readable translation that accurately represents a semantic meaning of the natural language input;
   process the machine-readable translation using structured data to generate a result;
   generate a natural language response using the result; and
   present the natural language response to a user on a client device.

2. The computer program product of claim 1, wherein the computer program instructions are further configured such that, when executed, the computer program instructions cause the one or more computing devices to:
   receive a second text string derived from second natural language input;
   generate a second input graph for the second text string, the second input graph representing a plurality of different subsets of words in the second text string;
   compare the second input graph to the template graph;
   identify one or more second terminal nodes in the template graph for the second input graph;
   generate a second score for each second terminal node, each second score based at least in part on an estimate of one or more probabilities associated with the second text string;
   select a second terminal node with reference to the one or more second scores, wherein none of the plurality of translation templates correspond to the selected second terminal node; and
   generate a notification that the second natural language input was not understood.

3. A computer-implemented method for translating a text string derived from natural language input to a machine-readable format, comprising:
   using one or more computing devices, generating an input graph for the text string, the input graph representing a plurality of different subsets of words in the text string;
   using the one or more computing devices, retrieving a template graph representing a plurality of translation templates, each translation template being for translating matching natural language input to the machine-readable format, and each translation template corresponding to at least one of a plurality of terminal nodes in the template graph, wherein each internal node of the template graph is labeled with an identifier of a highest priority template that can be reached from that point in the template graph;
   using the one or more computing devices, generating an intersection graph from the input graph and the template graph, each node in the intersection graph representing a tuple of corresponding nodes in the input and template graphs;

using the one or more computing devices, processing the intersection graph according to template priorities associated with the nodes of the template graph thereby identifying one or more candidate terminal nodes of the intersection graph, the template priorities associated with the terminal nodes of the template graph causing processing of the intersection graph to proceed preferentially along edges of the intersection graph leading to terminal nodes of the intersection graph that represent terminal nodes of the template graph that correspond to the highest priority templates;

using the one or more computing devices, selecting a terminal node in the template graph that corresponds to one of the one or more candidate terminal nodes of the intersection graph based at least in part on a probability associated with the selected terminal node of the template graph that the text string corresponds to an intended meaning of the natural language input, wherein a first translation template corresponds to the selected terminal node of the template graph;

using the one or more computing devices, translating the text string using the first translation template thereby generating a machine-readable translation that accurately represents a semantic meaning of the natural language input;

using the one or more computing devices, processing the machine-readable translation using structured data to generate a result;

using the one or more computing devices, generating a natural language response using the result; and using the one or more computing devices, presenting the natural language response to a user on a client device.

4. The method of claim 3, wherein the selected terminal node of the template graph is included in one or more terminal nodes of the template graph that correspond to the one or more candidate terminal nodes of the intersection graph, the method further comprising generating a score for each of the one or more terminal nodes of the template graph, each score representing an estimate of one or more probabilities associated with the text string and a translation template corresponding to the terminal node of the template graph.

5. The method of claim 4, wherein the estimate of the one or more probabilities is generated using a statistical estimate for smoothing of data representing previously received and translated natural language input.

6. The method of claim 4, wherein the score for each terminal node of the template graph is based at least in part on an estimate that the user intended input matching the translation template corresponding to the terminal node of the template graph.

7. The method of claim 3, wherein the input graph represents alternatives for at least some words of the text string, and wherein the template graph represents alternatives for at least some patterns represented by the translation templates.

8. The method of claim 3, wherein the input graph includes probabilities associated with the text string, and the template graph includes probabilities associated with the translation templates.

9. The method of claim 8, wherein processing the intersection graph includes accumulating an intermediate score for the text string with reference to the probabilities represented by the input graph and the template graph.

10. The method of claim 3, wherein each translation template has a corresponding priority score that specifies a priority ordering relative to others of the translation templates and is determined by one or more characteristics of that translation template.

11. The method of claim 3, wherein the text string is one of multiple text strings derived from the natural language input, the method further comprising receiving the text strings from speech recognition logic, each text string representing a particular interpretation of the natural language input, and generating the input graph to include the text strings.

12. A computing system for translating a text string derived from natural language input to a machine-readable format, comprising one or more computing devices configured to:

generate an input graph for the text string, the input graph representing a plurality of different subsets of words in the text string;

retrieve a template graph representing a plurality of translation templates, each translation template being for translating matching natural language input to the machine-readable format, and each translation template corresponding to at least one of a plurality of terminal nodes in the template graph, wherein each internal node of the template graph is labeled with an identifier of a highest priority template that can be reached from that point in the template graph;

generate an intersection graph from the input graph and the template graph, each node in the intersection graph representing a tuple of corresponding nodes in the input and template graphs;

process the intersection graph according to template priorities associated with the nodes of the template graph thereby identifying one or more candidate terminal nodes of the intersection graph, the template priorities associated with the terminal nodes of the template graph causing processing of the intersection graph to proceed preferentially along edges of the intersection graph leading to terminal nodes of the intersection graph that represent terminal nodes of the template graph that correspond to the highest priority templates;

select a terminal node in the template graph that corresponds to one of the one or more candidate terminal nodes of the intersection graph based at least in part on a probability associated with the selected terminal node of the template graph that the text string corresponds to an intended meaning of the natural language input, wherein a first translation template corresponds to the selected terminal node of the template graph;

translate the text string using the first translation template thereby generating a machine-readable translation that accurately represents a semantic meaning of the natural language input;

process the machine-readable translation using structured data to generate a result;

generate a natural language response using the result; and present the natural language response to a user on a client device.

13. The computing system of claim 12, wherein the selected terminal node of the template graph is included in one or more terminal nodes of the template graph that correspond to the one or more candidate terminal nodes of the intersection graph, the one or more computing devices being further configured to generate a score for each of the one or more terminal nodes of the template graph, each score representing an estimate of one or more probabilities associated with the text string and a translation template corresponding to the terminal node of the template graph.

14. The computing system of claim 13, wherein the estimate of the one or more probabilities is generated using a statistical estimate for smoothing of data representing previously received and translated natural language input.

15. The computing system of claim 13, wherein the score for each terminal node of the template graph is based at least in part on an estimate that the user intended input matching the translation template corresponding to the terminal node of the template graph.

16. The computing system of claim 12, wherein the input graph represents alternatives for at least some words of the text string, and wherein the template graph represents alternatives for at least some patterns represented by the translation templates.

17. The computing system of claim 12, wherein the input graph includes probabilities associated with the text string, and the template graph includes probabilities associated with the translation templates.

18. The computing system of claim 17, wherein the one or more computing devices are configured to process the intersection graph in a manner that includes accumulating an intermediate score for the text string with reference to the probabilities represented by the input graph and the template graph.

19. The computing system of claim 12, wherein each translation template has a corresponding priority score that specifies a priority ordering relative to others of the translation templates and is determined by one or more characteristics of that translation template.

20. The computing system of claim 12, wherein the text string is one of multiple text strings derived from the natural language input, and wherein the one or more computing devices are further configured to receive the text strings from speech recognition logic, each text string representing a particular interpretation of the natural language input, and generating the input graph to include the text strings.

* * * * *